2,733,193
SEPARATING AND CRACKING OF OIL FROM OIL-BEARING SANDS

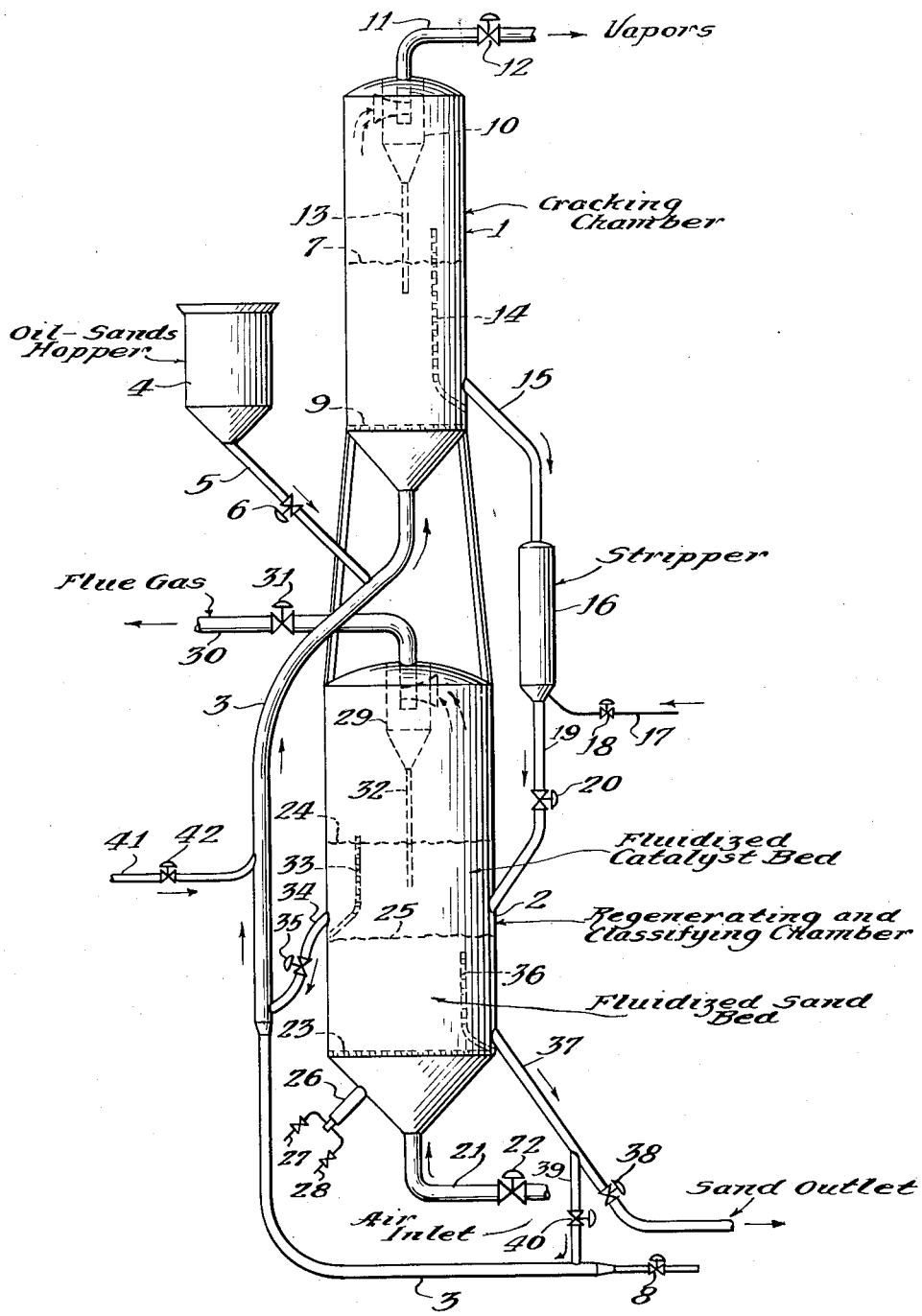

Vladimir Haensel, Hinsdale, Ill., assignor to Universal Oil Products Company, Chicago, Ill., a corporation of Delaware Application July 13, 1950, Serial No. 173,498

2 Claims. (Cl. 196—52)

This invention relates to a continuous fluidized method for carrying out simultaneously the separation and cracking of oil from oil-bearing sands, with the improved process being accomplished by contacting the oil-sands material with heated reactivated catalyst particles and recirculated heated oil-sand particles, which in turn are separated and returned in a controlled operation.

Various methods of handling tar or oil sands to recover the desired petroleum products have been utilized, as for example, hot water processing has been employed to remove the bitumen which has been adsorbed to the sand particles, and the bitumen is subsequently processed to obtain desired hydrocarbon fractions. Tar and oil sands have been also processed in the fluidized type of operation, with hot gaseous streams being introduced into a distilling and fluidizing zone to effect the vaporization of the hydrocarbon products. However, the use of high temperature flue gases for the distillation of the hydrocarbon from the oil sands is in general unsatisfactory in necessitating subsequent removal of large amounts of combustion gases from the vaporous products. The use of steam likewise necessitates the ultimate separation of hydrocarbon products from large quantities of water.

It is the principal object of the present invention to effect simultaneously the separation of hydrocarbon materials from the oil sands and the catalytic cracking of the resulting hydrocarbon vaporous materials within one contacting zone, so that a relatively large portion of the oil may be converted to more desirable low boiling products.

It is also an object of the present invention to provide means for effecting the continuous distillation and cracking in one zone, and simultaneously a reactivation of catalyst particles in a regeneration zone together with the burning of residual carbonaceous matter from sand particles, so that both catalyst and sand may be returned in a heated state to the conversion zone.

It is a still further object of the invention to utilize advantageously fluidized contacting within a separation and cracking zone, and fluidization within a reactivation and burning zone, to in turn effect an elutriation and classification between catalyst and inert sand particles, whereby catalyst and sand may be returned in selected quantities to the conversion zone.

Briefly, the present approved method for effecting the separation and catalytic cracking of oil, from oil containing sands, comprises, introducing the oil sands in particulated form to a distillation and cracking zone together with a heated stream of particles consisting primarily of subdivided catalytic material, effecting a fluidized contacting between the oil sands and the heated catalyst-containing particle stream within this cracking zone, discharging resulting hydrocarbon vapors from the upper portion of the distillation and cracking zone and withdrawing contacting solid material from the lower end thereof, passing the withdrawn and contacted particles, with a coke deposition thereon, to a burning and classification zone, introducing an oxygen-containing stream into the latter zone and effecting therein a burning of at least a major portion of the carbonaceous deposit from both the catalyst and sand particles while fluidizing and passing said oxygen-containing stream through the particles in a manner effecting a classification thereof into an upper fluidized bed of primarily catalyst particles and a lower fluidized bed of primarily sand particles, removing resulting combustion gases from the upper portion of the burning and classification zone while discharging a continuous stream of sand particles into the lower portion of the zone, and continuously withdrawing hot catalyst particles from the upper fluidized bed in the burning and classification zone and returning them to the distillation and cracking zone, together with fresh oil sand particles as heretofore set forth.

By effecting the simultaneous processing steps within both the cracking zone and the burning and classification zone, a relatively compact unit is provided and a minimum of transfer lines is necessitated to carry out the continuous fluidized operation. In other words, only two major contacting zones are utilized, with the separation and cracking of oil vapors being effected in a single confined conversion zone, and reactivation and heating together with the elutriation and classification of particles being effected within a single confined regenerating and classification zone. The latter zone being operated to effect substantially distinct fluidized beds of catalyst and sand particles and equipped with separate draw off means, so that selected quantities of catalyst or sand may be discharged or withdrawn from the chamber and selectively returned to the conversion zone.

Preferably, a catalyst having a density and particle size substantially different from that of the sand particles in the oil and tar sands is utilized, such that the classification of particles within the reactivation and separating zone effects the maintenance of two distinct layers of beds within the lower portion of that zone. The cracking catalyst may of course be any of the well known types of catalyst such as silica-alumina, silica-magnesia, silica-zirconia, or a natural catalyst such as Superfiltrol, with the catalyst particles being maintained in a finely divded state so that they readily fluidize and maintain a light fluidizable characteristic. The reactivation and classification zone has sufficient air or oxygen-containing gaseous stream charged thereto so that fluidization of all of the particles may be maintained within the lower portion of the chamber and effect the desired elutriation and classification so that the aforementioned distinct beds of particles are maintained. The reactivation zone is also equipped with two draw-off points, so that a sand-rich material may be withdrawn from the lower end of the chamber while a catalyst-rich, or sand-lean mixture, may be withdrawn from the upper portion or upper layer of the fluidized beds within the regenerator. Thus, the major portion of the sand-rich layer may be withdrawn and discarded from the operation while a subsequently reactivated catalyst stream may be continuously withdrawn from the upper layer and returned to the separation and cracking zone. A portion of the spent sand stream may of course be recycled to the separating and conversion zone together with the catalyst stream. The quantities of recycled sand and catalyst being governed by the heat requirements within the processing zone.

Inasmuch as some catalyst is of course lost with the sand-rich stream, which is discarded from the lower portion of the reactivation and classification zone, a small quality of fresh catalyst may be continuously added to the conversion unit to maintain a suitable catalyst to sand ratio for any desired separation and cracking reaction within the conversion zone. However, the elutriation and classification effected within the regeneration zone is preferably carried out in a manner to hold the catalyst loss to a minimum, so that the necessary catalyst addition to the unit does not exceed 0.5 lb. per barrel of oil obtained from the oil sand in the continuous operation.

The particle fluidization and contacting within the separation and cracking zone may be effected by any suitable inert gaseous medium, however, preferably the oil sand and catalyst particles introduced into the separation and cracking zone are fluidized and maintained in a hindered settling bed type of contacting by a vaporous stream which comprises one or more of the petroleum fractions obtained from the recovery of vapors and fractions discharged from the upper portion of the cracking zone. The hydrocarbon vaporous stream, or recycle stream, provides a fluidizing stream which effects the desired contacting between the catalyst sand particles and oil sand particles without necessitating an involved means of separation and recovery of hydrocarbons, as would steam or other inert gaseous mediums if used.

Reference to the accompanying drawing and the following descriptions thereof will serve to more clearly illustrate the improved continuous separation and cracking process, as well as point out still further advantages in its operation.

Referring now to the drawing, there is indicated a distillation and cracking chamber 1, which in this instance is illustrated as being supported at an elevated position above a lower regenerating and classifying chamber 2, so that the latter chamber may serve to support the upper and thus provide a more compact unit. Heated subdivided particles of catalyst and spent sand are carried in a fluidized stream upward through riser line 3 to the lower portion of the cracking chamber 1. Crushed particles of oil sands are passed from a hopper 4 by way of line 5 and control valve 6 to the riser line 3 so that the oil or tar-sand particles commingle with the hot catalyst and sand particles to be subsequently introduced into a fluidized bed of material maintained within the lower portion of the separation and cracking zone of chamber 1. The fluidized bed is indicated by the broken line 7.

A suitable fluidizing stream, which may be of an inert nature, or a hydrocarbon vapor stream, may be charged to the riser line 3. However, preferably a hydrocarbon vapor, such as a recycle fraction from the recovery end of the present cracking unit, is introduced at the lower end of the riser line 3 by way of the control valve 8 so as to transport the heated particles of catalyst and recycled sand material, together with the fresh oil sand particles into the cracking chamber 1, and also maintain the fluidization and intermixing of particles within the bed 7. A distributing grid 9, in the lower portion of chamber 1, is advantageous in effecting a uniform distribution of the gas and particle stream into the lower portion of the chamber.

Contacting is effected within the cracking chamber 1 in a manner separating and distilling a major portion of the hydrocarbonaceous material which adheres to the oil sand in a more or less bituminous state. The heat for distillation and separation of the bituminous material from the oil sands is furnished through the heat carried by both recirculated catalyst and sand particles, as will be more fully described hereinafter. The vaporized hydrocarbons are, however, contacted within the fluidized bed 7 by the catalyst material such that a large portion of the oil undergoes catalytic cracking, to provide lower boiling products of a desirable nature. The resulting distillate and cracked vapors pass from the upper end of the chamber 1 by way of a suitable mechanical or centrifugal separator, such as 10, with the substantially particle free vapors passing by way of line 11 and control valve 12 to suitable recovery and fractionating apparatus. The recovered solid material is returned by way of a suitable dip-leg 13 to the fluidized bed 7.

Contacted particles, including both contacted catalyst particles with a carbonaceous deposit, and oil sand particles with at least a major portion of the hydrocarbonaceous material removed by distillation, are continuously withdrawn through a suitable withdrawal well as provided by a perforated baffle 14 and conduit 15. These particles in a preferred operation pass through a suitable stripping chamber 16, wherein steam or other inert gaseous material passes upwardly countercurrently to the particles and effects contacting and stripping of at least a large part of the absorbed hydrocarbon vapors which are adsorbed or entrained with the descending particle stream. Stripping steam, or other material, may be introduced to the lower end of the stripper 16 by way of a suitable conduit 17 and control valve 18. The resulting stripped particles of catalyst or sand are then passed by way of the standpipe 19 and control valve 20 into the lower portion of the regenerating and classifying chamber 2.

In accordance with the present invention, the regenerating and classifying chamber 2 will accommodate both catalyst and spent or relatively inert sand from the oil or tar-sands material, and burning is carried out within the chamber by a suitable air or oxygen containing stream contacting the particles under fluidized conditions which effect simultaneously the oxidation and removal of carbon deposit and the elutriation or classification of material to effect a substantially satisfactory separation of catalyst from sand particles. The oxidizing and aerating stream is introduced by way of line 21 and control valve 22, and a suitable distributing plate 23 in the lower portion of the chamber 2, whereby to effect fluidization of the particulated material passing by way of standpipe 19 into the lower portion of the chamber. As hereinbefore mentioned, preferably a catalyst is used in this combined operation which has substantially lower density and smaller particle size than the sand of the tar or oil sands, so that during the continuous fluidization of particles within the lower portion of the chamber, a bed of the lighter catalyst particles is maintained as an upper layer or portion of the entire fluidized bed, the upper extremity being indicated by the broken line 24, while the upper extremity of the fluidized bed of sand particles is indicated by the broken line 25. It should of course be understood that there is no distinct line of demarcation between the fluidized sand and catalyst particles, but that a gradiation occurs throughout the entire depth of the fluidized bed with primarily catalyst particles reaching the upper level of the bed and the lower portion of the bed comprising primarily sand.

The oxygen or air stream being introduced through line 21, may if desired be diluted with suitable inert gas, recycle flue gas, steam or the like, in order to provide a sufficient quantity of fluidizing gaseous medium to effect the desired elutriation and classification of particles within the dense phase bed of particles in the chamber 2. Preferably, the burning of the carbonaceous deposit on the catalyst particles and residual carbonaceous matter on the sand particles effects the desired heating of particles which are to be recirculated through the cracking chamber 1 and provide the necessary heat therein for distillation of cracking. However, where it may be found economically desirable, additional heat may be introduced directly into the regenerating and classifying chamber 2 by way of a burner 26 receiving fuel and air through the lines 27 and 28. Thus, a close control may be maintained on chamber 2 to effect the heating of the particels to any desired temperature, to in turn maintain a desired heating and conversion balance throughout the entire contacting unit.

The combustion on flue gases which result from the reactivation and burning within chamber 2 are discharged by way of a suitable particle separator 29 and outlet line 30 with control valve 31. Recovered entrained particles are returned to the fluidized bed 24 by way of a suitable dip-leg 32.

It is a principal feature of the present regenerating and classifying operation to provide means for separately withdrawing catalyst and sand streams from the lower portion of the contacting chamber. A suitable particle draw off well is formed by a perforated baffle 33 at an intermediate level, so that a stream, primarily of catalyst particles may be withdrawn by way of conduit 34 and control valve 35, and introduced into the riser line 3. In addition, a withdrawal well is formed by a suitable perforated baffle 36 to provide means for withdrawing a stream of primarily sand particles by way of conduit 37 and valve 38. A major portion of the sand-rich, or catalyst lean stream, passing by way of conduit 37 is discarded from the unit, however, in order to supply heat to the conversion chamber 1, at least a portion of the separated sand particles may be withdrawn by way of line 39 and valve 40 to subsequently become mixed with catalyst and oil-sand particles in the riser line 3.

By proper selection of catalyst particles with respect to size and density, it is possible to obtain a very good separation of catalyst and sand particles within the fluidized bed of the regenerating chamber, so that only a very small portion of catalyst is lost or discarded with the stream of primarily sand particles being discharged by way of conduit 37. However, in order to make up for the catalyst particles lost in this manner, as well as with the flue gas stream being discharged by way of separator 29 and line 30, provision is made by way of line 41 and control valve 42 for continuously introducing a small amount of catalyst into the contacting unit. Thus, a proper catalyst to oil, or to oil-sands, ratio may be maintained within the cracking chamber 1. As hereinbefore mentioned, the processing operation is preferably maintained to hold the catalyst loss to a miximum so that the catalyst addition is not too large and economically unsound, with fresh catalyst added to the unit being not more than about 0.5 of a pound per barrel of oil recovered from the oil-sands.

The apparatus arrangement which is shown in the present drawing is of course diagrammatic in that the present improved operation, with the simultaneous separation and cracking effected in the conversion chamber and the reactivation of catalyst effected in combination with the classifying operation, need not be carried out in this particular arrangement. For example, the position of one chamber over another is economically advantageous in permitting the gravity flow of particles from the upper zone to the lower zone and the elimination of fluidization or gas lifting to transfer particles to one of the two contacting zones. However, the regenerating and classifying chamber may if desired be positioned in the elevated position and the separation and cracking chamber maintained at a lower position, such that the reactivated and heated particles pass in a gravity flow to the conversion chamber, and conversely, the contacted catalyst and oil-sand particles are carried upwardly by a fluidizing or gas-lift stream, which in this instance would be the air or oxygen-containing stream.

Also, the present embodiment indicates the crushed oil-sands particles passing from a hopper 4 into the riser line 3, but it is to be noted that the particles may pass directly into the contacting and cracking chamber 1, and therein pass either concurrently or countercurrently to the fluidized bed of particles being composed of both catalyst and sand particles. Likewise, fresh catalyst may be added directly to the cracking chamber 1, rather than to the riser line 3 as indicated in the present drawing. Burners for additional heat, may of course be provided in connection with the cracking chamber 1, but in accordance with a preferred operation which utilizes two distinct and separate contact chambers, hot combustion gases are maintained only within the reactivation and classification chamber, so that all heat is carried to the cracking and conversion chamber by the particles and the fluidizing medium, with the latter being preferably a hydrocarbon vapor so as not to contaminate the resulting hydrocarbon vapors and bring about a subsequent separation problem in the fractionation and recovery section.

I claim as my invention:

1. A continuous method for simultaneously recovering and catalytically cracking hydrocarbons from subdivided particles of oil-sands, which comprises, introducing oil-sand particles together with a rising stream of hydrocarbon vapors, obtained as hereinafter described, and heated particles of primarily a finely divided light catalyst into the lower portion of an elevated distilling and cracking zone, said catalyst particles being of lower density and smaller size than the sand of said oil-sand particles, passing the vaporous stream and subdivided particles upwardly through said zone and effecting a fluidized contacting between said particles to distill hydrocarbonaceous vapors from said oil-sands and the cracking of said vapors within said zone, discharging resulting contacted hydrocarbon vapors from the upper portion of said cracking zone, withdrawing contacted solid particles comprising both catalyst and spent oil sand from said fluidized bed of material maintained therein and passing it in a descending gravity flow through a stripping zone maintained at a lower elevation than said distilling and cracking zone, countercurrently contacting said particles within said stripping zone with a substantially inert heated stripping medium, subsequently passing the stripped catalyst and sand particles in a continuous gravity flow to an intermediate portion of a confined regenerating and classification zone, introducing a stream containing free oxygen to the lower portion of said regenerating and classification zone in a quantity and at a velocity sufficient to maintain a fluidization of said stripped particles within the lower portion of said regenerating and classification zone while simultaneously effecting both a burning of at least a major portion of the carbonaceous matter from both catalyst and oil-sand particles and an elutriation and classification between catalyst and sand particles, said light finely divided catalyst particles being maintained primarily in an upper bed above a fluidized bed of heavier sand particles, discharging resulting combustion gases from the upper portion of said regenerating and classification zone, withdrawing a stream of primarily sand particles from the lower portion of the fluidized bed of particles maintained within said regenerating zone, continuously withdrawing a heated stream of primarily catalyst particles from the upper portion of the fluidized bed of particles maintained in said regenerating and classification zone and commingling said stream with a hydrocarbon vapor stream comprising at least a portion of the cracked hydrocarbon vaporous stream discharged from the upper portion of the elevated distilling and cracking zone, subsequently commingling said hydrocarbon stream and regenerated catalyst particles with subdivided oil-sands and passing the mixture in a rising stream to the lower portion of said distilling and cracking zone as hereinbefore described.

2. The method of claim 1, further characterized, in that a portion of the withdrawn stream comprising primarily sand particles in the lower portion of said bed in said regenerating and classification zone is commingled with said catalyst and hydrocarbon vapor stream, whereby to supply additional heated particles to said distillation and cracking zone, and fresh finely divided catalyst particles are continuously added to said distilling and cracking zone to maintain a desired catalyst to oil-sand ratio therein at suitable cracking conditions.

References Cited in the file of this patent
UNITED STATES PATENTS

| | | |
|---|---|---|
| 2,355,016 | Stein | Aug. 1, 1944 |
| 2,423,674 | Agren | July 8, 1947 |
| 2,428,873 | Gunness et al. | Oct. 14, 1947 |
| 2,446,247 | Scheineman | Aug. 3, 1948 |
| 2,480,670 | Peck | Aug. 30, 1949 |
| 2,541,186 | Anderson | Feb. 13, 1951 |
| 2,561,396 | Matheson | July 24, 1951 |
| 2,573,906 | Huff | Nov. 6, 1951 |
| 2,627,499 | Krebs | Feb. 3, 1953 |